United States Patent
Zhang et al.

(10) Patent No.: US 12,234,929 B2
(45) Date of Patent: Feb. 25, 2025

(54) QUICK CONNECTION CLAMPING HOOP

(71) Applicant: SHANDONG LEDE MACHINERY CO., LTD, Weifang (CN)

(72) Inventors: Tonghu Zhang, Weifang (CN); Chengfei Pan, Weifang (CN); Ming Li, Weifang (CN)

(73) Assignee: SHANDONG LEDE MACHINERY CO., LTD, Weifang (CN)

( * ) Notice: Subject to any disclaimer, the term of this patent is extended or adjusted under 35 U.S.C. 154(b) by 0 days.

(21) Appl. No.: 18/532,902

(22) Filed: Dec. 7, 2023

(65) Prior Publication Data
US 2024/0102588 A1 Mar. 28, 2024

Related U.S. Application Data

(60) Division of application No. 17/317,492, filed on May 11, 2021, which is a continuation of application No. PCT/CN2019/124153, filed on Dec. 10, 2019.

(30) Foreign Application Priority Data

Dec. 14, 2018 (CN) .......................... 201811535029.4

(51) Int. Cl.
  *F16L 17/04* (2006.01)
  *F16L 21/06* (2006.01)
(52) U.S. Cl.
  CPC ............. *F16L 17/04* (2013.01); *F16L 21/065* (2013.01)

(58) Field of Classification Search
  CPC .......... F16L 21/06; F16L 21/065; F16L 17/04; F16J 15/025; F16J 15/104; F16J 15/062; Y10S 277/905
  See application file for complete search history.

(56) References Cited

U.S. PATENT DOCUMENTS 1,704,003 A * 3/1929 Percy ..................... F16L 17/04
                                                                285/108
2,451,354 A   10/1948 Ohls
(Continued)

FOREIGN PATENT DOCUMENTS

CN     101994885 A    3/2011
CN     201858461 U    6/2011
(Continued)

OTHER PUBLICATIONS

JP-H066875 Translation (Year: 1994).*
(Continued)

*Primary Examiner* — Zachary T Dragicevich
*Assistant Examiner* — Alexander T Rufrano

(57) ABSTRACT

A quick connection clamping hoop, including an upper clamping hoop body and a lower clamping hoop body that are both in a semi-annular shape; where the upper clamping hoop body and the lower clamping hoop body each have one end as a plug connecting end and the other end as a connecting end; connecting ends of the upper clamping hoop body and the lower clamping hoop body each are provided with a lug, and the connecting ends of the two are connected together via a bolt passing through lugs; plug connecting ends of the two are connected together via a plug connecting mechanism disposed at the plug connecting ends of the two.

2 Claims, 10 Drawing Sheets

(56) References Cited

U.S. PATENT DOCUMENTS

| | | | |
|---|---|---|---|
| 3,464,722 A | 9/1969 | Larkin | |
| 4,643,461 A | 2/1987 | Thau, Jr. | |
| 4,702,500 A | 10/1987 | Thau, Jr. | |
| 4,915,418 A | 4/1990 | Palatchy | |
| 4,940,261 A | 7/1990 | Somers Vine | |
| 5,018,768 A * | 5/1991 | Palatchy | F16L 23/10 285/24 |
| 5,039,137 A * | 8/1991 | Cankovic | F16L 25/14 285/236 |
| 5,203,594 A | 4/1993 | Straub | |
| 6,206,434 B1 | 3/2001 | Schreiter | |
| 8,038,176 B2 * | 10/2011 | Bowman | F16L 17/04 285/112 |
| 8,960,729 B2 | 2/2015 | Chiproot | |
| 9,435,469 B2 | 9/2016 | Bancroft et al. | |
| 9,791,079 B2 | 10/2017 | Considine et al. | |
| 10,436,352 B2 | 10/2019 | Peterson et al. | |
| 11,378,208 B2 | 7/2022 | Ohnemus et al. | |
| 11,448,346 B2 | 9/2022 | Belen et al. | |
| 2012/0145270 A1 | 6/2012 | Krausz et al. | |
| 2012/0256415 A1 | 10/2012 | Dole | |
| 2013/0257045 A1 * | 10/2013 | Mikami | F16L 17/04 285/364 |
| 2014/0015248 A1 | 1/2014 | Dole | |
| 2018/0347732 A1 | 12/2018 | Kang et al. | |
| 2021/0247007 A1 | 8/2021 | Artsiely | |

FOREIGN PATENT DOCUMENTS

| | | |
|---|---|---|
| CN | 202532058 U | 11/2012 |
| CN | 203757222 U | 8/2014 |
| CN | 105387298 A | 3/2016 |
| CN | 106062457 A | 10/2016 |
| CN | 207527170 | 6/2018 |
| CN | 108325130 A | 7/2018 |
| CN | 108700233 A | 10/2018 |
| CN | 108980485 A | 12/2018 |
| CN | 109442108 A | 3/2019 |
| CN | 209180532 U | 7/2019 |
| EP | 0931966 A1 | 7/1999 |
| EP | 2112414 A1 | 10/2009 |
| GB | 239992 | 9/1925 |
| GB | 315550 A | 7/1929 |
| GB | 326707 A * | 3/1930 |
| GB | 2098297 | 11/1982 |
| GB | 2211255 | 6/1989 |
| GB | 2349189 A | 10/2000 |
| JP | S62202590 U | 12/1987 |
| JP | H066875 U * | 1/1994 |
| JP | H06006875 U | 1/1994 |
| KR | 100209981 B1 | 7/1999 |
| KR | 101508659 B1 | 4/2015 |
| KR | 20160086657 A | 7/2016 |
| KR | 1020160102153 A | 8/2016 |
| KR | 20180131215 A | 12/2018 |

OTHER PUBLICATIONS

Request for the Submission of an Opinion dated Dec. 26, 2022 for Korean patent Application No. 10-2021-7014419.
European Search Report dated Jan. 4, 2022 for European patent Application No. 19895499.2.
International Search Report and Written Opinion dated Feb. 27, 2020 for International Application No. PCT/CN2019/124153.
Notification of Grant Patent Right for Invention dated Apr. 11, 2024 for Chinese Patent Application No. 201811535029.4.
Office Action dated Jun. 3, 2024 for U.S. Appl. No. 17/317,492.
Office Action dated Dec. 26, 2023 for U.S. Appl. No. 17/317,492.
First Office Action dated Dec. 7, 2023 for Chinese Patent Application No. 201811535029.4.
Office Action dated Sep. 17, 2024 for U.S. Appl. No. 17/317,492.

* cited by examiner

QUICK CONNECTION CLAMPING HOOP

CROSS-REFERENCE TO RELATED APPLICATIONS

This application is a divisional application of U.S. patent application Ser. No. 17/317,492, filed on May 11, 2021, which is a continuation of International Application No. PCT/CN2019/124153, filed on Dec. 10, 2019. The International Application claims priority to Chinese Patent Application No. 201811535029.4, filed on Dec. 14, 2018. All of the aforementioned applications are hereby incorporated by reference in their entireties.

TECHNICAL FIELD

The present application relates to a clamping hoop for pipe connection, and in particular, to a quick connection clamping hoop.

BACKGROUND

At present, a quick connection clamping hoop is widely used for pipe connection due to its convenient use and fast connection speed. An existing quick connection clamping hoop includes an upper clamping hoop body and a lower clamping hoop body that are both in a semi-annular shape, two upper convex ribs are disposed on an inner annular face of the upper clamping hoop body at intervals, the two upper convex ribs being radially inward convex and extending in a circumferential direction of the inner annular face, and an upper sealing ring groove located between the upper convex ribs is disposed on the inner annular face; two lower convex ribs are disposed on an inner annular face of the lower clamping hoop body at intervals, the two lower convex ribs being radially inward convex and extending in a circumferential direction of the inner annular face, and a lower sealing ring groove located between the lower convex ribs is disposed on the inner annular face; two end parts of the upper clamping hoop body and the lower clamping hoop body each are provided with a lug, the upper clamping hoop body and the lower clamping hoop body are connected together via bolts passing through lugs after end-to-end connections, and a sealing ring installed in the upper and lower sealing ring grooves is disposed between the upper clamping hoop body and the lower clamping hoop body.

The quick connection clamping hoop in the foregoing structure mainly has the following defects: first, connections at two ends are performed with the bolts, and when the upper clamping hoop body and the lower clamping hoop body are assembled and when the clamping hoop is connected to a pipe, two bolts need to be rotated, thereby reducing assembly efficiency and efficiency of connection and fastening with the pipe. Second, a distance between a groove bottom of the upper sealing ring groove and an inner annular face of an upper convex rib is an upper groove depth, and the upper groove depth is the same from a middle part of the upper clamping hoop body to two end parts; and a distance between a groove bottom of the lower sealing ring groove and an inner annular face of a lower convex rib is a lower groove depth, and the lower groove depth is the same from a middle part of the lower clamping hoop body to two end parts. Since an outer circumference of the sealing ring of the quick connection clamping hoop is greater than a sum of lengths of the upper and lower sealing ring grooves, after the upper clamping hoop body and the lower clamping hoop body are assembled together, a gap occurs at an end part of the quick connection clamping hoop, and when the clamping hoop is sleeved on the pipe for fastening, the sealing ring is deformed under pressure to protrude from the gap, which easily causes poor contact between a segment corresponding to a protruding part of the sealing ring and the pipe, so as to result in sealing failure. Third, a body of the sealing ring is connected with a retaining ring, since the retaining ring is firmly connected to the body of the sealing ring integrally, the retaining ring hinders free contraction of the sealing ring when the clamping hoop is tightly locked, which causes the sealing ring and the retaining ring to form corrugated unevenness, and as aging of the sealing ring, the retaining ring drives the sealing ring to contract inward, so that the body of the sealing ring and a ring lip are bonded together, thereby losing a self-sealing function and causing sealing failure.

Technical Problem

One of the technical problems to be solved by the present application is to provide a quick connection clamping hoop that is faster and convenient when the clamping hoop itself is assembled and connected to a pipe with respect to the first defect in the foregoing background.

Technical Solutions

To solve the foregoing technical problem, the present application provides a quick connection clamping hoop in the following structure, including an upper clamping hoop body and a lower clamping hoop body that are both in a semi-annular shape, two upper convex ribs being disposed on an inner annular face of the upper clamping hoop body at intervals, the two upper convex ribs being radially inward convex and extending in a circumferential direction of the inner annular face, and an upper sealing ring groove located between the upper convex ribs being disposed on the inner annular face; and two lower convex ribs being disposed on an inner annular face of the lower clamping hoop body at intervals, the two lower convex ribs being radially inward convex and extending in a circumferential direction of the inner annular face, and a lower sealing ring groove located between the lower convex ribs being disposed on the inner annular face; where structural features of the quick connection clamping hoop lie in: the upper clamping hoop body and the lower clamping hoop body each have one end as a plug connecting end and the other end as a connecting end; connecting ends of the upper clamping hoop body and the lower clamping hoop body each are provided with a lug, and the connecting ends of the two are connected together via a bolt passing through lugs; plug connecting ends of the upper clamping hoop body and the lower clamping hoop body are connected together via a plug connecting mechanism disposed at the plug connecting ends of the two; and after end-to-end connections, the upper clamping hoop body and the lower clamping hoop body are capable of enclosing central space for receiving a pipe, and a sealing ring installed in the upper and lower sealing ring grooves is disposed in the central space.

The plug connecting mechanism includes two connecting blocks connected to the plug connecting end of the upper clamping hoop body, the connecting blocks are connected with a connecting post, and the connecting blocks, the connecting post and the upper clamping hoop body enclose an inserting hole; the plug connecting end of the lower clamping hoop body is connected with a connecting arm whose outer end is a hook; and the hook of the connecting arm is capable of being hooked on the connecting post after the connecting arm is inserted into the inserting hole, so as to achieve an inserting connection of the plug connecting ends of the upper clamping hoop body and the lower clamping hoop body.

A face of the hook in contact with the connecting post and a face of the connecting post in contact with the hook are both arc faces.

The plug connecting mechanism includes a connecting plate connected to the plug connecting end of the upper clamping hoop body, the connecting plate is connected with a plug connecting post, and an inserting gap is disposed between the plug connecting post and the upper clamping hoop body; the plug connecting end of the lower clamping hoop body is connected with a plug connecting arm whose outer end is a hook; and the hook of the plug connecting arm is capable of being hooked on the plug connecting post after the plug connecting arm is inserted into the inserting gap, so as to achieve an inserting connection of the plug connecting ends of the upper clamping hoop body and the lower clamping hoop body.

A face of the hook in contact with the plug connecting post and a face of the plug connecting post in contact with the hook are both arc faces.

According to the present application, to solve the second defect in the foregoing background, the following improvements are made on the basis of the foregoing technical solution.

A distance between a groove bottom of the upper sealing ring groove of the upper clamping hoop body and an inner annular face of an upper convex rib is an upper groove depth; the upper groove depth is the greatest at a middle part of the upper clamping hoop body and the smallest at an end part of the upper clamping hoop body; a distance between a groove bottom of the lower sealing ring groove of the lower clamping hoop body and an inner annular face of a lower convex rib is a lower groove depth; and the lower groove depth is the greatest at a middle part of the lower clamping hoop body and the smallest at an end part of the lower clamping hoop body.

The upper groove depth gradually decreases from the middle part of the upper clamping hoop body to two end parts; and the lower groove depth gradually decreases from the middle part of the lower clamping hoop body to two end parts.

A groove bottom face of the upper sealing ring groove is an arc face in an elliptical arc shape, and the inner annular face of the upper convex rib is an arc face in an elliptical arc shape; and a groove bottom face of the lower sealing ring groove is an arc face in an elliptical arc shape, and the inner annular face of the lower convex rib is an arc face in an elliptical arc shape.

According to the present application, to solve the third defect in the foregoing background, the following improvements are made on the basis of the foregoing technical solutions.

The sealing ring includes a rubber ring body, two ends of the rubber ring body each are provided with an end wall that is integrally connected with the rubber ring body and is provided with an axial through hole in a central part, an inner edge of the end wall is axially inward convex to form a ring lip, and the sealing ring further includes a retaining ring not directly integrally connected with the rubber ring body.

The number of retaining rings are two, and the retaining rings are respectively connected to two ring lips.

A plurality of bumps are annularly disposed on an inner wall face of the rubber ring body, sockets are disposed on the bumps, and the retaining ring is inserted in the sockets.

An inner annular face of the retaining ring is connected with a guiding sleeve.

An annular connecting body is inserted between the rubber ring body and the ring lip, the annular connecting body is configured to be hollow to form a ring cavity, an opening is disposed on an outer annular face of the annular connecting body in a circumferential direction of the annular connecting body, and the retaining ring is connected to an inner annular face of the annular connecting body.

A plurality of liquid passage holes are annularly disposed on an inner annular face of the retaining ring, and the liquid passage holes are in communication with the ring cavity.

Beneficial Effects

According to the present application, an upper clamping hoop body and a lower clamping hoop body each have two ends respectively configured as a plug connecting end and a connecting end. Plug connecting ends are connected via a plug connecting mechanism, not only can a connection of the plug connecting ends of the upper clamping hoop body and the lower clamping hoop body be achieved quickly via the plug connecting structure, but also disassembly of them is achieved quickly. Connecting ends are connected via a bolt passing through lugs and a nut screwed onto the bolt. That is, when the upper clamping hoop body and the lower clamping hoop body are assembled, only one bolt and a nut need to be rotated relative to each other, and thus assembly of a clamping hoop is quick and convenient, which could greatly improve assembly efficiency. Similarly, when the clamping hoop is connected to a pipe, only one bolt and a nut need to be rotated relative to each other to achieve a fastening connection between the clamping hoop and the pipe, and thus efficiency of pipe connection could also be greatly improved.

According to the present application, a lower groove depth is set to be the greatest at a middle part of the lower clamping hoop body and to be the smallest at an end part of the lower clamping hoop body, and a upper groove depth is set to be the greatest at a middle part of the upper clamping hoop body and to be the smallest at an end part of the upper clamping hoop body. When the clamping hoop is fastened in this way, residual deformation of a sealing ring may be converged from the end parts of the upper and lower clamping hoop bodies to the middle parts of the upper and lower clamping hoop bodies after the sealing ring is deformed under pressure, which is not prone to a phenomenon that the sealing ring protrudes from the end parts of the upper and lower clamping hoop bodies after being deformed under pressure, may effectively ensure full contact between the sealing ring and the pipe, and could ensure a sealing effect.

According to the present application, a retaining ring is not directly integrally connected with a rubber ring body. The retaining ring not only plays a limiting role, but also does not hinder free contraction of the sealing ring when the clamping hoop is tightly locked, which does not cause the sealing ring and the retaining ring to form corrugated unevenness, and as aging of the sealing ring, the retaining ring does not drive the sealing ring to contract inward, which avoids that a body of the sealing ring and a ring lip are bonded together to lost a self-sealing function and cause sealing failure.

DESCRIPTION OF DRAWINGS

Specific embodiments of the present application will be further described below in detail with reference to the accompanying drawings.

BEST EMBODIMENTS OF THE PRESENT APPLICATION

Figure 1:
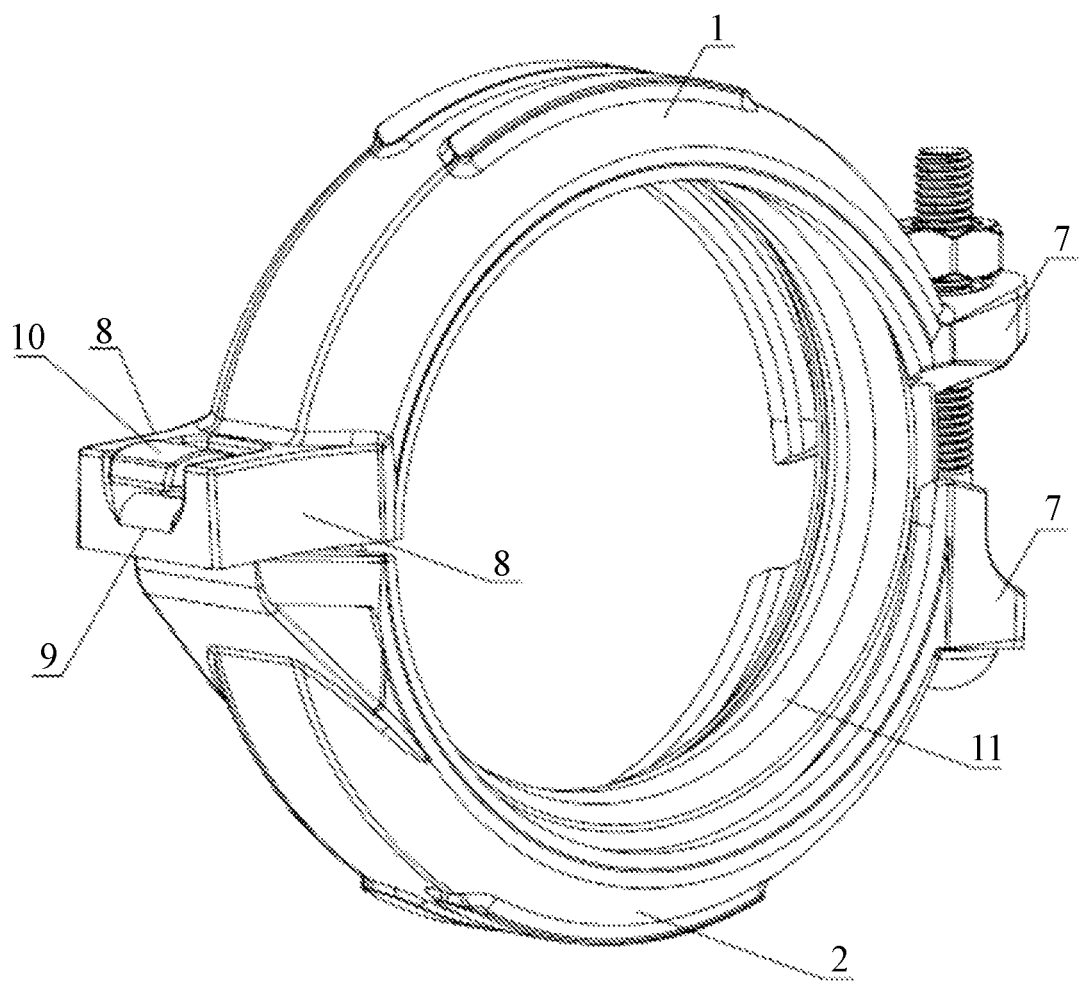
FIG. 1 is a schematic stereoscopic structural diagram of a first structure of the present application.

With reference to FIGS. 1 to 5, a quick connection clamping hoop in a first structure includes an upper clamping hoop body 1 and a lower clamping hoop body 2 that are both in a semi-annular shape, two upper convex ribs 3 being disposed on an inner annular face of the upper clamping hoop body 1 at intervals, the two upper convex ribs 3 being radially inward convex and extending in a circumferential direction of the inner annular face, and an upper sealing ring groove 4 located between the upper convex ribs 3 being disposed on the inner annular face; and two lower convex ribs 5 being disposed on an inner annular face of the lower clamping hoop body 2 at intervals, the two lower convex ribs 5 being radially inward convex and extending in a circumferential direction of the inner annular face, and a lower sealing ring groove 6 located between the lower convex ribs being disposed on the inner annular face. The upper clamping hoop body 1 and the lower clamping hoop body 2 each have one end as a plug connecting end and the other end as a connecting end. Connecting ends of the upper clamping hoop body 1 and the lower clamping hoop body 2 each are provided with a lug 7, and the connecting ends of the upper clamping hoop body 1 and the lower clamping hoop body 2 are connected together via a bolt passing through lugs 7 and a nut screwed onto the bolt. Plug connecting ends of the upper clamping hoop body 1 and the lower clamping hoop body 2 are connected together via a plug connecting mechanism disposed at the plug connecting ends of the two. The plug connecting mechanism includes two connecting blocks 8 connected to the plug connecting end of the upper clamping hoop body 1, the connecting blocks 8 are connected with a connecting post 9, and the connecting blocks 8, the connecting post 9 and the upper clamping hoop body 1 enclose an inserting hole; the plug connecting end of the lower clamping hoop body 2 is connected with a connecting arm 10 whose outer end is a hook; and the hook of the connecting arm 10 is capable of being hooked on the connecting post after the connecting arm 10 is inserted into the inserting hole, so as to achieve an inserting connection of the plug connecting ends of the upper clamping hoop body 1 and the lower clamping hoop body 2. When the bolt at the connecting ends is fastened after the clamping hoop is connected to a pipe, to facilitate approach of the plug connecting ends of the upper clamping hoop body 1 and the lower clamping hoop body 2 to each other, a face of the hook in contact with the connecting post and a face of the connecting post in contact with the hook are both set to be arc faces. Contact of the arc faces causes the connecting post and the hook to easily move relative to each other. During fastening, the connecting post slides along the arc face of the hook to an inner end of the hook while relative rotation occurs on the hook and the connecting post, and the plug connecting ends of the upper clamping hoop body 1 and the lower clamping hoop body 2 gradually approach to each other as the bolt is fastened. After relative connections of the connecting ends and the plug connecting ends of the upper clamping hoop body 1 and the lower clamping hoop body 2, central space for receiving a pipe can be enclosed, and a sealing ring 11 installed in the upper and lower sealing ring grooves is disposed in the central space.

Figure 2:
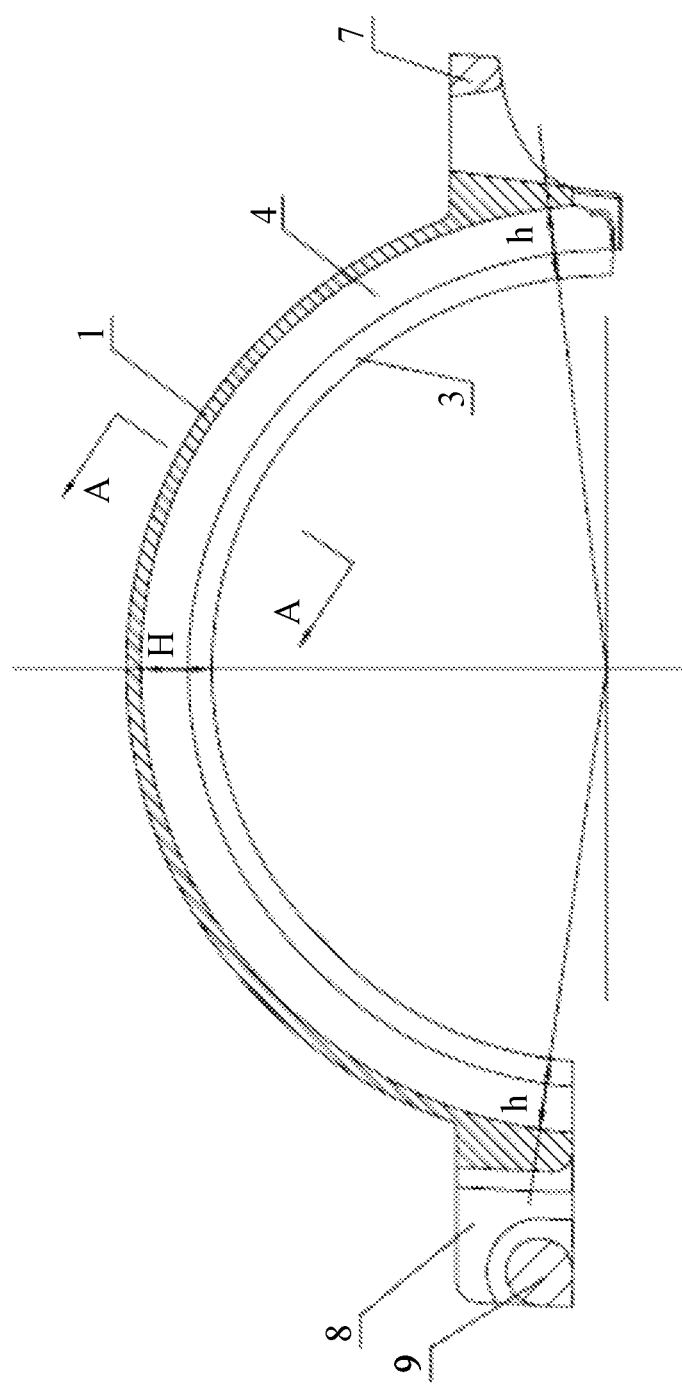
FIG. 2 is a schematic diagram of a structure of an upper clamping hoop body in FIG. 1, that is, an orthographic projection view of the upper clamping hoop body after being cut along a center line of gyration perpendicular to the upper clamping hoop body.
Figure 3:
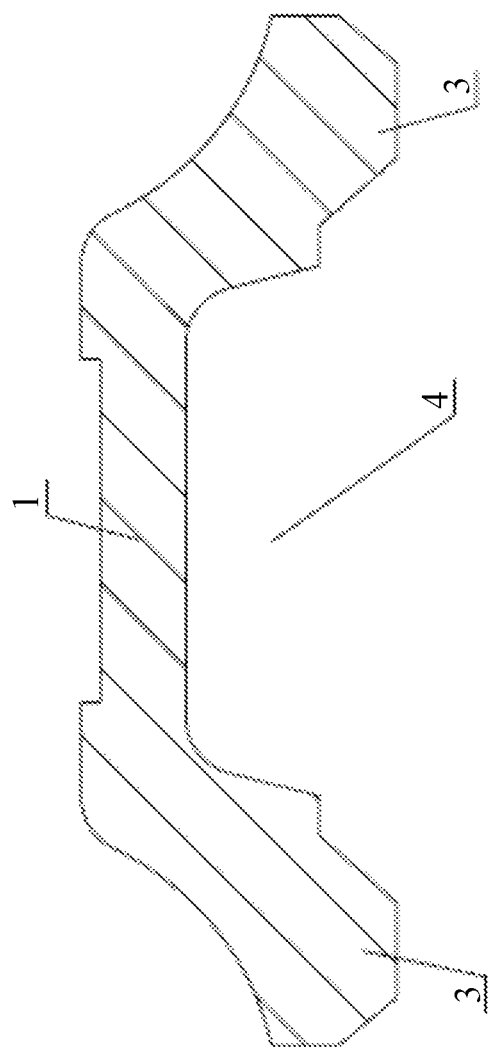
FIG. 3 is a sectional view taken along a line A-A in FIG. 2.

With reference to FIG. 2, a distance between a groove bottom of the upper sealing ring groove 4 of the upper clamping hoop body 1 and an inner annular face of an upper convex rib 3 is an upper groove depth, the distance is a distance in a radial direction of the inner annular face of the upper convex rib 3, that is, in the view of FIG. 2, after a radial line passing through a center of gyration of the upper clamping hoop body intersects with a projection contour line of the groove bottom of the upper sealing ring groove 4 and a projection contour line of the inner annular face of the upper convex rib 3, a distance between two intersection points is the upper groove depth. The upper groove depth is the greatest at a middle part of the upper clamping hoop body 1 and the smallest at an end part of the upper clamping hoop body 1. H in FIG. 2 represents the upper groove depth at the middle part of the upper clamping hoop body 1, and h represents the upper groove depth at two end parts of the upper clamping hoop body 1. The upper groove depth gradually decreases from the middle part of the upper clamping hoop body 1 to the two end parts, and a value from H to h gradually decreases. The upper groove depth is set to gradually decrease from the middle part of the upper clamping hoop body 1 to the two end parts, which can receive deformation of the sealing ring better, and can effectively prevent the sealing ring from protruding from the end parts of the upper and lower clamping hoop bodies after being deformed under pressure.

Figure 4:
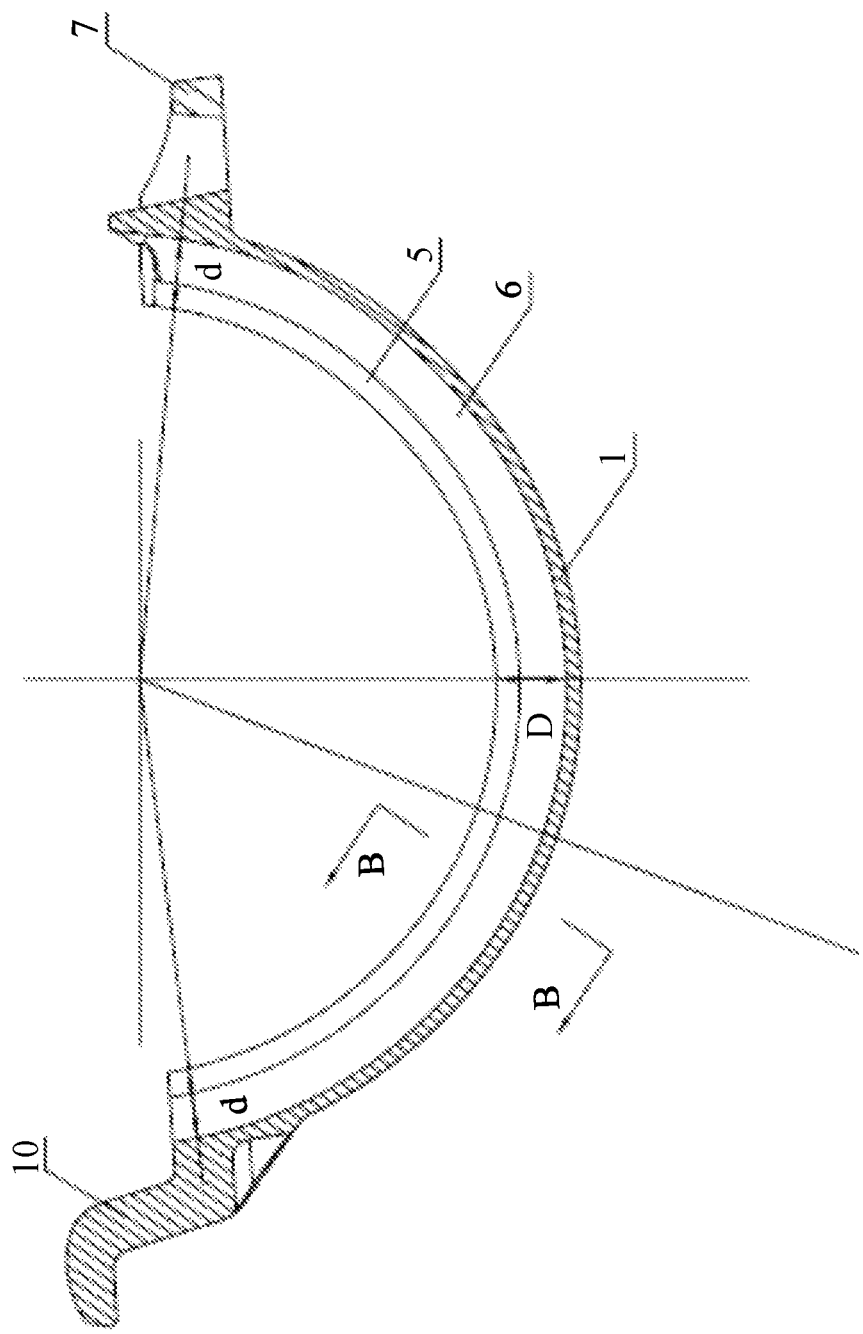
FIG. 4 is a schematic diagram of a structure of a lower clamping hoop body in FIG. 1, that is, an orthographic projection view of the lower clamping hoop body after being cut along a center line of gyration perpendicular to the lower clamping hoop body.
Figure 5:
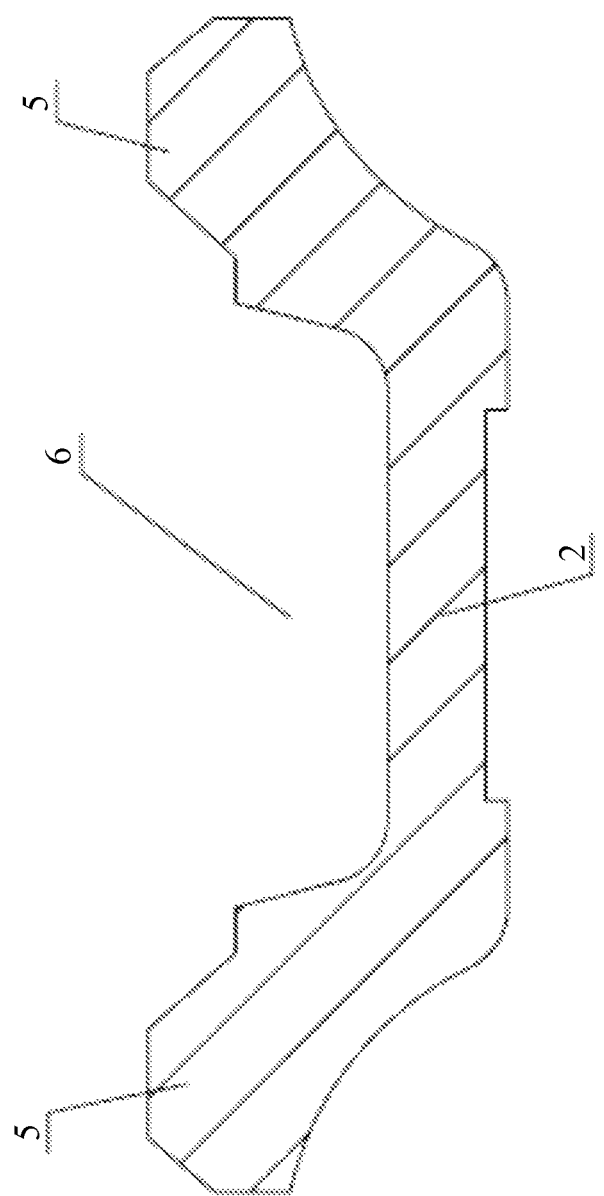
FIG. 5 is a sectional view taken along a line B-B in FIG. 4.

With reference to FIG. 4, a distance between a groove bottom of the lower sealing ring groove 6 of the lower clamping hoop body 2 and an inner annular face of a lower convex rib 5 is a lower groove depth, the distance is a distance in a radial direction of the inner annular face of the lower convex rib 5, that is, in the view of FIG. 4, after a radial line passing through a center of gyration of the lower clamping hoop body intersects with a projection contour line of the groove bottom of the lower sealing ring groove 6 and a projection contour line of the inner annular face of the lower convex rib 5, a distance between two intersection points is the lower groove depth. The lower groove depth is the greatest at a middle part of the lower clamping hoop body 2 and the smallest at an end part of the lower clamping hoop body 2. D in FIG. 4 represents the lower groove depth at the middle part of the lower clamping hoop body 2, and d represents the lower groove depth at two end parts of the lower clamping hoop body 2. The lower groove depth gradually decreases from the middle part of the lower clamping hoop body 2 to the two end parts, and a value from D to d gradually decreases. The lower groove depth is set to gradually decrease from the middle part of the lower clamping hoop body 2 to the two end parts, which can receive deformation of the sealing ring better, and can effectively prevent the sealing ring from protruding from the end parts of the upper and lower clamping hoop bodies after being deformed under pressure.

A groove bottom face of the upper sealing ring groove 4 is preferably designed as an arc face in an elliptical arc shape, and the inner annular face of the upper convex rib 3 is preferably designed as an arc face in an elliptical arc shape; that is, in an orthographic projection view of the clamping hoop body after being cut along a center line of gyration perpendicular to the upper clamping hoop body, that is, in FIG. 2, a contour line formed by projection of the groove bottom face of the upper sealing ring groove 4 is an elliptical arc, and a contour line formed by projection of the inner annular face of the upper convex rib 3 is also an elliptical arc. A groove bottom face of the lower sealing ring groove 6 is preferably designed as an arc face in an elliptical arc shape, and the inner annular face of the lower convex rib 5 is preferably designed as an arc face in an elliptical arc shape; that is, in an orthographic projection view of the clamping hoop body after being cut along a center line of gyration perpendicular to the lower clamping hoop body, that is, in FIG. 4, a contour line formed by projection of the groove bottom face of the lower sealing ring groove 6 is an elliptical arc, and a contour line formed by projection of the inner annular face of the lower convex rib 5 is also an elliptical arc. The advantages of designing the groove bottom face of the upper sealing ring groove 4 and the inner annular face of the upper convex rib 3 and the groove bottom face of the lower sealing ring groove 6 and the inner annular face of the lower convex rib 5 as arc faces in an elliptical arc shape lie in: after end-to-end connections, the central space for receiving a pipe enclosed by two clamping hoop bodies is in an elliptical shape, which can cause the pipe to be inserted into the central space more easily. After the two clamping hoop bodies are fastened, the clamping hoop bodies is deformed by force to cause the central space to be circular, so that the clamping hoop bodies can be tightly attached to the pipe, which can ensure a firm connection and a sealing effect. Therefore, in products actually put on the market, a generally used technical solution is to design the groove bottom face of the upper sealing ring groove 4 and the inner annular face of the upper convex rib 3 and the groove bottom face of the lower sealing ring groove 6 and the inner annular face of the lower convex rib 5 as arc faces in an elliptical arc shape.

Embodiments of the Present Application

Figure 6:
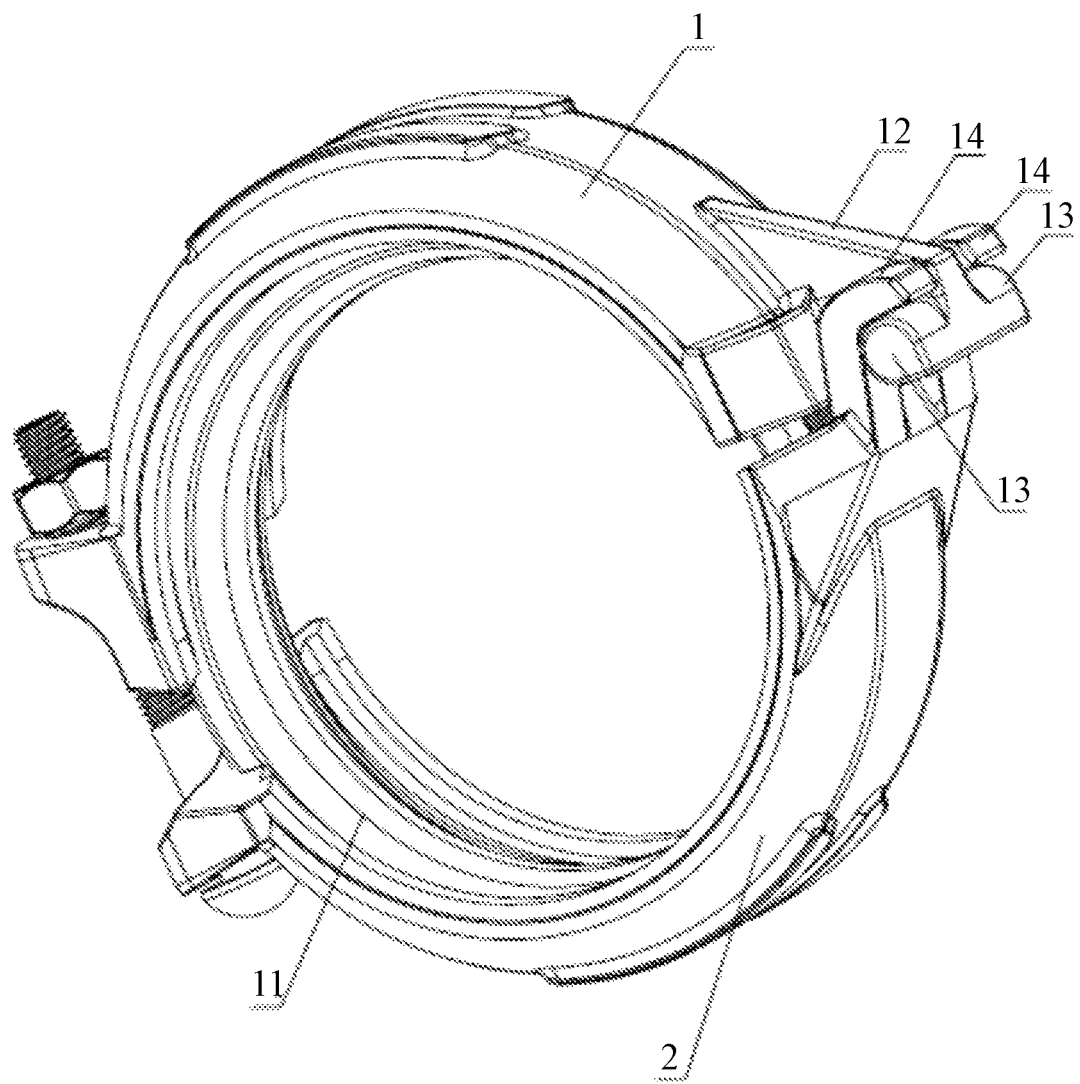
FIG. 6 is a schematic stereoscopic structural diagram of a second structure of the present application.

With reference to FIG. 6, a quick connection clamping hoop in a second structure is basically the same as the quick connection clamping hoop in the foregoing first structure, and a difference only lies in a different plug connecting mechanism. The plug connecting mechanism of the quick connection clamping hoop in the second structure includes a connecting plate 12 connected to the plug connecting end of the upper clamping hoop body 1, the connecting plate 12 is connected with a plug connecting post 13, and an inserting gap is disposed between the plug connecting post 13 and the upper clamping hoop body 1. The plug connecting end of the lower clamping hoop body 2 is connected with a plug connecting arm 14 whose outer end is a hook; and the hook of the plug connecting arm 14 is capable of being hooked on the plug connecting post 13 after the plug connecting arm 14 is inserted into the inserting gap, so as to achieve an inserting connection of the plug connecting ends of the upper clamping hoop body 1 and the lower clamping hoop body 2. A face of the hook in contact with the plug connecting post and a face of the plug connecting post in contact with the hook are both arc faces. When the bolt at the connecting ends is fastened after the clamping hoop is connected to a pipe, to facilitate approach of the plug connecting ends of the upper clamping hoop body 1 and the lower clamping hoop body 2 to each other, a face of the hook in contact with the plug connecting post and a face of the plug connecting post in contact with the hook are both set to be arc faces. Contact of the arc faces causes the plug connecting post and the hook to easily move relative to each other. During fastening, the plug connecting post slides along the arc face of the hook to an inner end of the hook while relative rotation occurs on the hook and the plug connecting post, and the plug connecting ends of the upper clamping hoop body 1 and the lower clamping hoop body 2 gradually approach to each other as the bolt is fastened.

Figure 7:
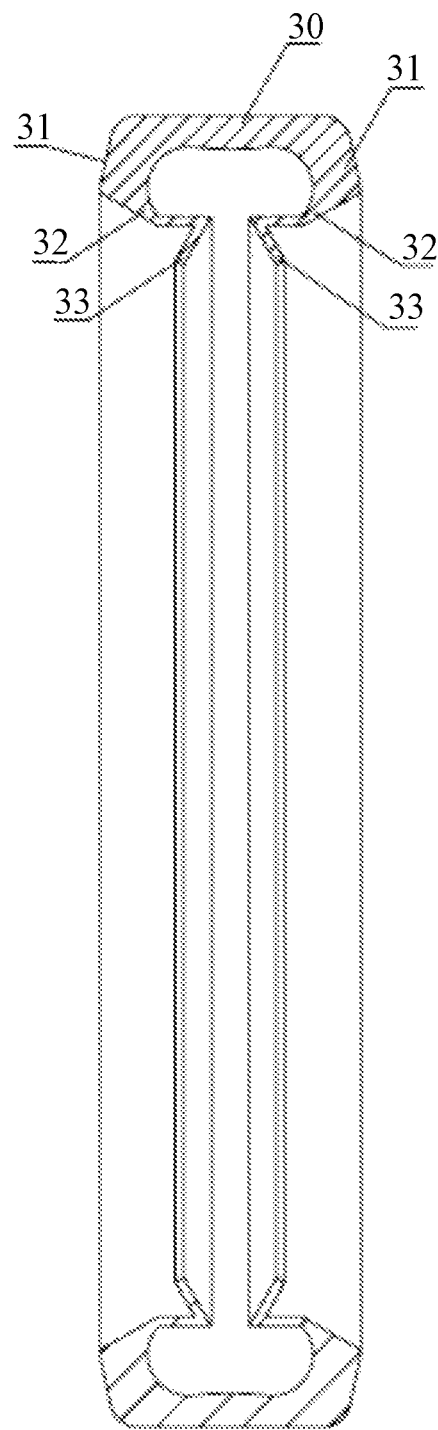
FIG. 7 is a schematic diagram of a structural form of a sealing ring.

A structural form of the foregoing sealing ring 11 is shown in FIG. 7. The sealing ring includes a rubber ring body 30, two ends of the rubber ring body 30 each are provided with an end wall 31 that is integrally connected with the rubber ring body and is provided with an axial through hole in a central part, an inner edge of the end wall is axially inward convex to form a ring lip 32, the sealing ring further includes a retaining ring 33, and the retaining ring 33 may play a role of locating and limiting the pipe inserted into the clamping hoop to prevent the pipe from over-insertion. The retaining ring 33 is not directly integrally connected with the rubber ring body 30, the number of retaining rings 33 are two, and the retaining rings 33 are respectively connected to two ring lips 32.

Figure 8:
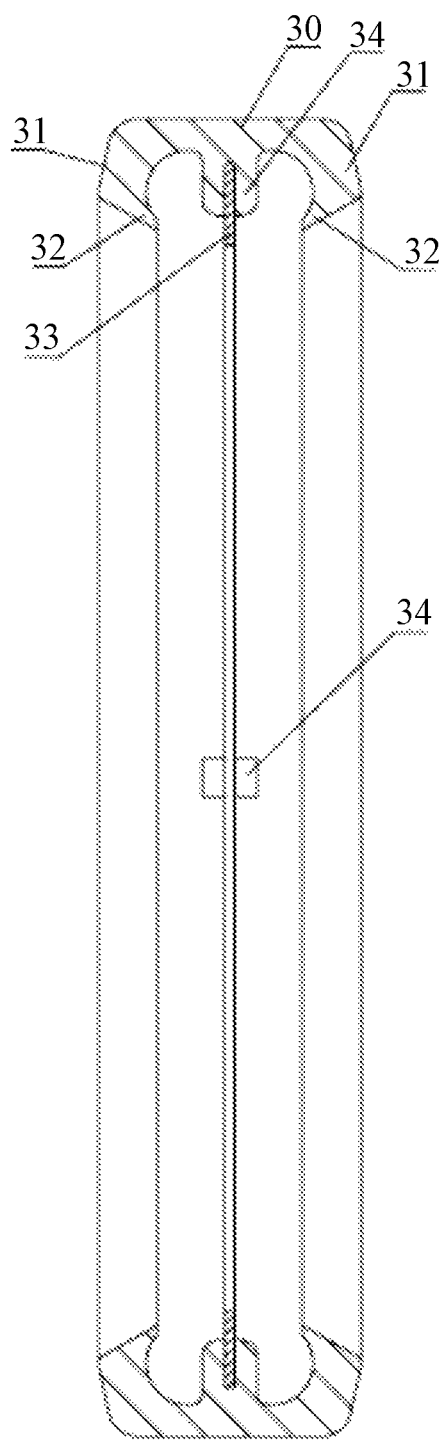
FIG. 8 is a schematic diagram of a second structural form of a sealing ring.
Figure 9:
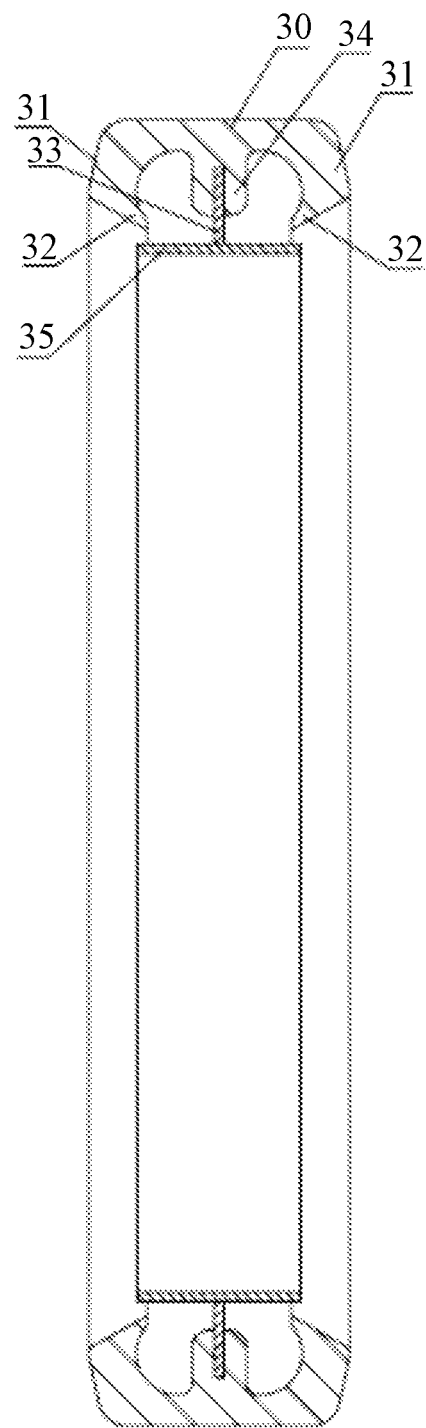
FIG. 9 is a schematic diagram of a third structural form of a sealing ring.

A second structural form of the sealing ring 11 is shown in FIG. 8. The sealing ring includes a rubber ring body 30, two ends of the rubber ring body 30 each are provided with an end wall 31 that is integrally connected with the rubber ring body and is provided with an axial through hole in a central part, an inner edge of the end wall is axially inward convex to form a ring lip 32, the sealing ring further includes a retaining ring 33, a plurality of bumps 34 are annularly disposed on an inner wall face of the rubber ring body, sockets are disposed on the bumps 34, the retaining ring 33 is not directly integrally connected with the rubber ring body 30, and the retaining ring 33 is inserted in the sockets and easily disassembled. A third structural form of the sealing ring 11 is shown in FIG. 9, which is an improvement made on the basis of the second structural form. The improvement lies in that an inner annular face of the retaining ring 33 is connected with a guiding sleeve 35, and the guiding sleeve 35 can be inserted into the pipe to guide the pipe inserted into the clamping hoop.

Figure 10:
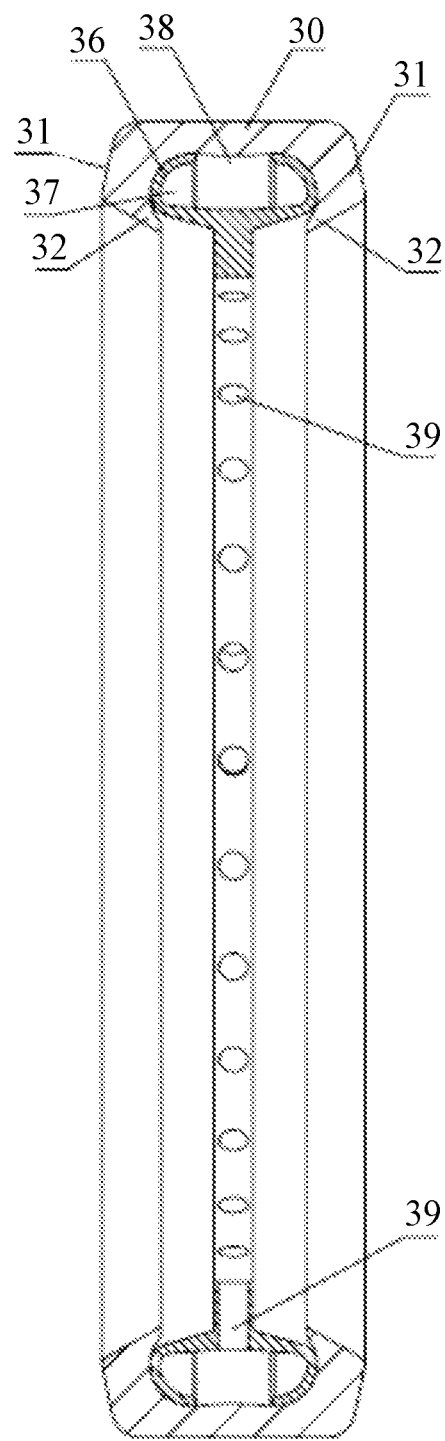
FIG. 10 is a schematic diagram of a fourth structural form of a sealing ring.

A fourth structural form of the sealing ring 11 is shown in FIG. 10. The sealing ring includes a rubber ring body 30, two ends of the rubber ring body 30 each are provided with an end wall 31 that is integrally connected with the rubber ring body and is provided with an axial through hole in a central part, an inner edge of the end wall is axially inward convex to form a ring lip 32, an annular connecting body 36 is inserted between the rubber ring body and the ring lip, the annular connecting body 36 is configured to be hollow to form a ring cavity 37, an opening 38 in communication with the ring cavity 37 is disposed on an outer annular face of the annular connecting body in a circumferential direction of the annular connecting body, the sealing ring further includes a retaining ring 33, and the retaining ring 33 is connected to an inner annular face of the annular connecting body. To prevent formation of closed space among the annular connecting body 36, the rubber ring body 30 and the ring lip 32 so that liquid cannot enter between the ring lip and the rubber ring body to lost a self-sealing function of the ring lip, a plurality of liquid passage holes 39 are annularly disposed on an inner annular face of the retaining ring, the liquid passage holes 39 are in communication with the ring cavity 37, and the liquid may enter between the ring lip and the rubber ring body from the liquid passage holes 39.

PRACTICAL APPLICABILITY

According to the present application, an upper clamping hoop body and a lower clamping hoop body each have two ends respectively configured as a plug connecting end and a connecting end. Plug connecting ends are connected via a plug connecting mechanism, not only can a connection of the plug connecting ends of the upper clamping hoop body and the lower clamping hoop body be achieved quickly via the plug connecting structure, but also disassembly of them is achieved quickly. Connecting ends are connected via a bolt passing through lugs and a nut screwed onto the bolt. That is, when the upper clamping hoop body and the lower clamping hoop body are assembled, only one bolt and a nut need to be rotated relative to each other, and thus assembly of a clamping hoop is quick and convenient, which could greatly improve assembly efficiency. Similarly, when the clamping hoop is connected to a pipe, only one bolt and a nut need to be rotated relative to each other to achieve a fastening connection between the clamping hoop and the pipe, and thus efficiency of pipe connection could also be greatly improved. According to the present application, a lower groove depth is set to be the greatest at a middle part of the lower clamping hoop body and to be the smallest at an end part of the lower clamping hoop body, and a upper groove depth is set to be the greatest at a middle part of the upper clamping hoop body and to be the smallest at an end part of the upper clamping hoop body. When the clamping hoop is fastened in this way, residual deformation of a sealing ring may be converged from the end parts of the upper and lower clamping hoop bodies to the middle parts of the upper and lower clamping hoop bodies after the sealing ring is deformed under pressure, which is not prone to a phenomenon that the sealing ring protrudes from the end parts of the upper and lower clamping hoop bodies after being deformed under pressure, may effectively ensure full contact between the sealing ring and the pipe, and could ensure a sealing effect. According to the present application, a retaining ring is not directly integrally connected with a rubber ring body. The retaining ring not only plays a limiting role, but also does not hinder free contraction of the sealing ring when the clamping hoop is tightly locked, which does not cause the sealing ring and the retaining ring to form corrugated unevenness, and as aging of the sealing ring, the retaining ring does not drive the sealing ring to contract inward, which avoids that a body of the sealing ring and a ring lip are bonded together to lost a self-sealing function and cause sealing failure.

What is claimed is:

1. A quick connection clamping hoop, comprising an upper clamping hoop body and a lower clamping hoop body that are both in a semi-annular shape,
    two upper convex ribs being disposed on an inner annular face of the upper clamping hoop body at intervals, the two upper convex ribs being radially inward convex and extending in a circumferential direction of the inner annular face, and an upper sealing ring groove located between the upper convex ribs being disposed on the inner annular face;
    and two lower convex ribs being disposed on an inner annular face of the lower clamping hoop body at intervals, the two lower convex ribs being radially inward convex and extending in a circumferential direction of the inner annular face, and a lower sealing ring groove located between the lower convex ribs being disposed on the inner annular face;
    wherein the upper clamping hoop body and the lower clamping hoop body each have one end as a plug connecting end and the other end as a connecting end;
    connecting ends of the upper clamping hoop body and the lower clamping hoop body each are provided with a lug, and the connecting ends of the two are connected together via a bolt passing through lugs;
    plug connecting ends of the upper clamping hoop body and the lower clamping hoop body are connected together via a plug connecting mechanism disposed at the plug connecting ends of the two;
    and after end-to-end connections, the upper clamping hoop body and the lower clamping hoop body are capable of enclosing central space for receiving a pipe, and a sealing ring installed in the upper and lower sealing ring grooves is disposed in the central space;
    the sealing ring comprises a rubber ring body, two ends of the rubber ring body each are provided with an end wall that is integrally connected with the rubber ring body and is provided with an axial through hole in a central part, an inner edge of the end wall is axially inward convex to form a ring lip, and the sealing ring further comprises a retaining ring not directly integrally connected with the rubber ring body;
    a plurality of bumps are annularly disposed on an inner wall face of the rubber ring body, sockets are disposed on the bumps, and the retaining ring is inserted in the sockets.

2. The quick connection clamping hoop according to claim 1, wherein an inner annular face of the retaining ring is connected with a guiding sleeve.

* * * * *